Jan. 26, 1971   L. E. DAY ET AL   3,557,426
HOLDER FOR USE IN REPLACING COTTON PICKER SPINDLES
Filed May 22, 1968
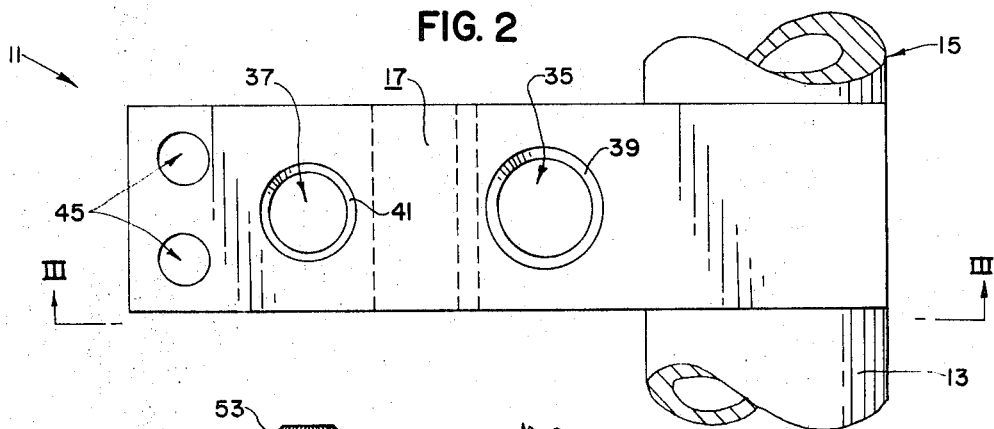
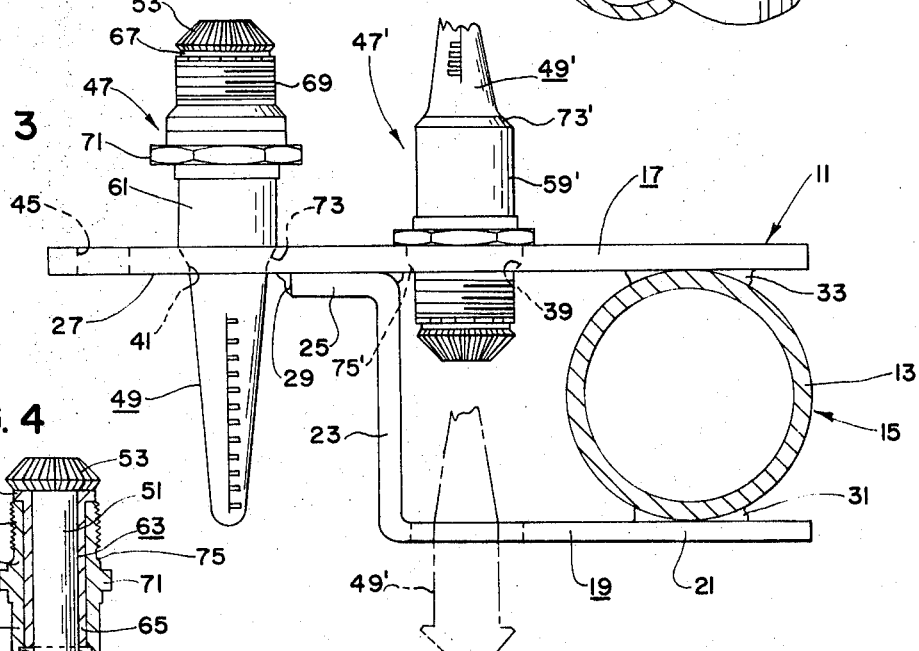
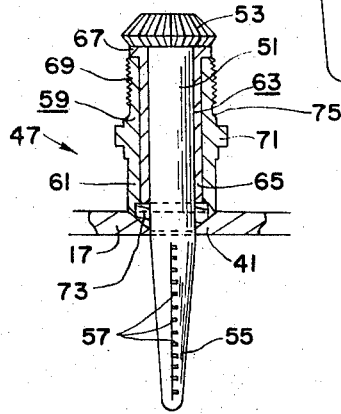
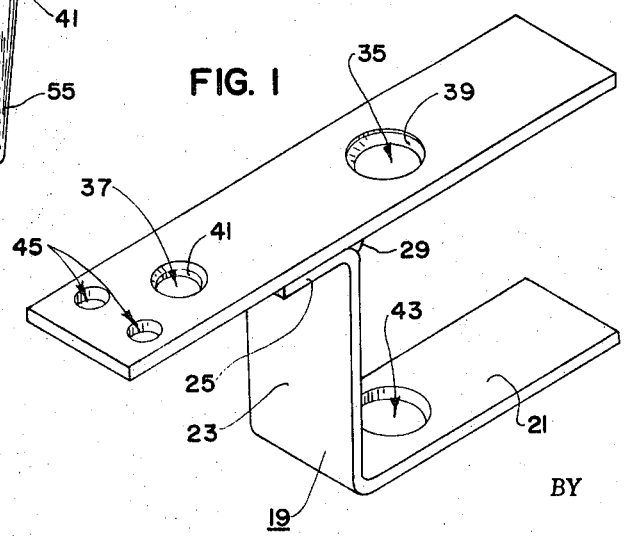
INVENTORS
LEON E. DAY
EDWARD F. GAREY
BY
John R. Walker, III
Attorney United States Patent Office 3,557,426
Patented Jan. 26, 1971

3,557,426
HOLDER FOR USE IN REPLACING COTTON PICKER SPINDLES
Leon E. Day, 2269 Jackson Ave., Memphis, Tenn. 38112, and Edward F. Garey, 1419 N. Avalon, West Memphis, Ark. 72301
Filed May 22, 1968, Ser. No. 731,056
Int. Cl. B23p 7/00, 19/00; B23q 1/00
U.S. Cl. 29—200     3 Claims

ABSTRACT OF THE DISCLOSURE

For use with a drum-type cotton picker having many spindle-bushing assemblies mounted in picker bars, and wherein when a spindle of a spindle-bushing assembly is worn or broken, the assembly is removed, the spindle driven from the bushing and a new spindle inserted in the bushing: The invention provides a cantilever-configured, bracket-like apertured holder adapted to be fixed on the support structure of a cotton picker—the spindle assembly is inserted in one aperture of the holder and the spindle driven from the bushing, and then the spindle-bushing assembly is inverted and inserted in another aperture of the holder for installing a new spindle on the bushing.

BACKGROUND OF THE INVENTION (1) Field of the invention

It relates to cotton picker servicing generally and particularly relates to tools for repairing cotton picker spindles.

(2) Description of the prior art

Previously, when a cotton picker was working in the field, and picked up a root, chunk or the like in the picking head, and when the chunk or the like damaged the picking spindles, it was necessary to replace the bent, broken or damaged spindle. Previously, the general practice in replacing broken spindles in a cotton picker was to remove the spindle bushing assemblies, carry the assemblies from the field or work area to a shop, remove and replace the broken spindles with new spindles, carry the repaired spindle-bushing assemblies back to the field or work area and reinstall the assemblies in the cotton picker. This, of course resulted in much down time for the cotton picking machine, and reduced the amount of cotton harvested.

SUMMARY OF THE INVENTION

The general concept of the invention is to provide a bracket-like anvil or holder means adapted for rigid attachment on the frame of a cotton picker for positioning a spindle-bushing assembly in such positions that a damaged spindle may be removed and a new or rebuilt spindle reinstalled in the sleeve of a spindle-bushing assembly. The bracket-like holder permits the ready replacement of a broken spindle in the field without having to carry the damaged parts to a shop to effect such repairs: Damaged cotton picker spindles may be repaired in the field expeditiously and with less down time from the cotton picking process.

BRIEF DESCRIPTION OF THE DRAWING

FIG. 1 is a perspective view of the spindle holder of the present invention shown unattached from the cotton picker frame.

FIG. 2 is a top view of the spindle holder shown attached to the cotton picker frame.

FIG. 3 is a vertical plane view taken as on the line III—III of FIG. 2 showing the holder in elevation and illustrating the holder holding two spindle-bushing assemblies.

FIG. 4 is a sectional view of a spindle-bushing assembly and a fragmentary view also of a part of the holder.

DESCRIPTION OF THE PREFERRED EMBODIMENT

The spindle-bushing holder of the present invention is indicated by numeral 11 and is adapted to be fixedly secured cantilever fashion on a horizontal frame member 13 of frame means 15 of a cotton picker. Holder 11 includes an elongated plate 17 and an L-shaped brace 19 formed of heavy strap or plate stock. L-shaped brace 19 is subjacently arranged relative to plate 17 and includes a horizontal leg 21 and vertical leg 23 having distal end portions respectively fixedly secured to frame member 13 and the intermediate portion of plate 17. Brace leg 23 includes a right angularly bent horizontal leg extension 25 fixedly secured in face to face engagement with the undersurface 27 of elongated plate 17. Weld beads 29, 31 rigidly secure respectively opposite end portions of brace 19 to plate 17 and to cotton picker frame member 13. Weld beads 33 rigidly secure the proximal end of holder plate 17 to an upper portion of cotton picker frame member 13.

Holder plate 17 includes structure defining first and second apertures 35, 37 arranged respectively on opposite sides of L-shaped brace vertical leg 23. First aperture 35 is of larger diameter than second aperture 37 and the aperture structure defining respectively apertures 35, 37 defines circular internal flange-like beads 39, 41 arranged respectively in the lower portions of apertures 35, 37. Horizontal leg 21 of brace 19 includes structure defining an aperture 43 arranged in vertical coaxial alignment with first aperture 35 of holder plate 17. One or more apertures 45, smaller in diameter than apertures 35, 37 preferably are formed in the distal portion of horizontal holder plate 17 for holding spare spindles (two apertures 45 being illustrated in FIG. 1).

FIGS. 3 and 4 illustrate spindle-bushing assemblies 47, 47', with assembly 47 representing a new or reconditioned assembly having a new spindle 49, and with assembly 47' representing an old or used assembly having a broken or damaged spindle 49'.

FIG. 4 illustrates new spindle-bushing assembly 47 and a description of this assembly will suffice also for a description of spindle assembly 47': Spindle 49 of assembly 47 includes a cylindrical shank portion 51, a proximal portion having a beveled gear 53 and a tapered distal portion 55 having a series of cotton fiber engaging barbs 57. Spindle 49 is operatively fitted in a bushing assembly 59 including a bushing housing 61 and sleeve 63. Sleeve 63 is provided with a tubular body 65 and an external circular flange portion 67 interposedly arranged between the proximal end of bushing housing 61 and spindle gear 53. Flange portion 67 of sleeve 63 provides thrust bearing means for spindle 49 and for operatively constraining bevel gear 53 against a drive gear in the cotton picker bar (not shown). In typical manner, spindle-bushing 61 is provided with external threads 69 and nut means 71 for threaded engagement with the vertical picker bar of the cotton picker. Spindle 49 is fitted in bushing assembly 59 with spindle shank portion 51 being turnably secured in body 65 of bushing sleeve 63. A retainer ring 73 is concentrically frictionally fixed on spindle shank portion 51 and operatively secures the spindle in against axial displacement in bushing assembly 59.

In replacing a broken spindle with a new spindle, the following procedure may be carried out: The spindle-bushing assembly 47 is threadedly removed from the cotton picker spindle bar (not shown) and the spindle-bushing assembly is supported in holder 11 with the proximal threaded end portion thereof inserted in first aperture 35 of plate 17 (note the righthand spindle-bushing assembly in FIG. 3). A hammer and drift punch (not shown) may then be used to drivingly disengage spindle 49' from retainer ring 73' by percussionarily striking the broken end portion of the spindle. As the spindle is driven from bushing assembly 59', the spindle passes downwardly through aperture passageway 43 in horizontal leg 21 of brace 19 (see broken line showing in FIG. 3). When driving the spindle from the bushing assembly, the sloped shoulder portion 75' of the assembly 59' abuttingly engages circular internal bead 39 of aperture 35 and provides anvil means for the removal of the spindle. When replacing a new spindle 49 in bushing assembly 59, the bushing assembly is removed from aperture 35, inverted, and positioned in second aperture 37 with retainer ring 73 abuttingly engaging circular internal bead 41 of second aperture 37. With bushing assembly 59 positioned thusly, a new spindle 49 is inserted in the bore of sleeve 63 and driven home by striking gear portion 53 with the hammer. Spindle-bushing assembly 47 may then be removed from holder 11 and threadedly reinstalled in the picker bar of the cotton picker.

While I have shown and described a preferred embodiment of the present invention, it will be understood that various changes and modifications in structure may be made without departing from the spirit and scope of the present invention as defined in the claims.

We claim:

1. A holder adapted for repair use with a cotton picker having a plurality of spindle bars, each bar having a plurality of spindle-bushing assemblies, each assembly including a spindle, a bushing having an inner sleeve portion having proximal and distal end portions and a retainer ring frictionally fixed on the shank of said spindle for preventing axial displacement of said spindles and spindle bushing; said bushing assembly being adapted to be removed from said spindle bar for replacing a worn or damaged spindle by disengaging and then re-engaging a spindle and bushing; said holder being adapted to be rigidly supported on frame structure of said cotton picker for use in drivingly engaging and disengaging a spindle and spindle-bushing, and comprising a plate, means rigidly attaching said plate horizontally cantilever fashion on the frame structure of said cotton picker, aperture structure of said plate defining two discrete vertical generally circular apertures including first aperture structure adapted for use in disengagingly disassembling said spindle and sleeve of each spindle-bushing assembly, and second aperture structure adapted for use in engagingly assembling said spindle and sleeve, said first and second apertures each being defined in part by a circular internal flange-like bead integrally formed with said plate and arranged adjacent the lower portions respectively of said first and second apertures, said first aperture being diametrically larger than said second aperture, said spindle being adapted to be removed from said bushing by placing the proximal end portion of said bushing downwardly in said first aperture with said bushing abuttingly engaging the bead structure of said first aperture, and then by striking the distal end of the spindle with a hammer, to frictionally disengagingly disassemble the spindle and bushing by frictionally disengaging said retainer ring from said spindle; said second aperture being adapted for a new spindle to be installed in said bushing by placing the distal end portion of said bushing downwardly in said second aperture and with the retainer abuttingly engaging the bead structure of said second aperture, and then inserting a spindle into said bushing and ring and by striking the proximal end of said spindle with a hammer, to frictionally firmly engage and assemble said spindle, bushing and ring.

2. The holder of claim 1 wherein said plate is elongated and supported cantilever fashion on the frame structure of said cotton picker and wherein said first and second aperture structures are spaced apart relative to the longitudinal extension of said plate and wherein said holder additionally includes a generally L-shaped brace member having horizontal and vertical brace legs and with the upper distal end portion of said vertical brace leg being rigidly fixed to the undersurface of said plate at a location between said first and second aperture structures and with that end portion of said horizontal leg remote from said vertical leg being rigidly attached to the frame structure of said cotton picker, and wherein said horizontal brace leg includes structure defining a through aperture arranged in vertical alignment with the aperture of said first aperture structure of of said plate, the aperture of said horizontal brace leg affording passageway means for downward passage of a spent spindle or spindle part as it is percussionarily separated from the bushing and retainer ring of the spindle-bushing assmmebly.

3. The holder of claim 2 wherein said plate includes structure defining at least one vertical through spare spindle aperture adapted to removably receive the distal end portion of a new spindle carried on the cotton picker as a spare spindle.

References Cited
UNITED STATES PATENTS

| | | | |
|---|---|---|---|
| 3,182,385 | 5/1965 | Esposito | 29—283X |
| 3,234,634 | 2/1966 | Johnson et al. | 29—200 |

THOMAS H. EAGER, Primary Examiner

U.S. Cl. X.R.

29—283, 401